United States Patent [19]
Schmitt, Sr.

[11] 3,992,798
[45] Nov. 23, 1976

[54] FISHING POLE HOLDER

[76] Inventor: Anthony S. Schmitt, Sr., 4121 Springdale Ave., St. Louis, Mo. 63134

[22] Filed: Jan. 5, 1976

[21] Appl. No.: 646,559

Related U.S. Application Data

[63] Continuation-in-part of Ser. No. 549,906, Feb. 14, 1975, Pat. No. 3,945,143.

[52] U.S. Cl. .................................... 43/17; 43/21.2
[51] Int. Cl.² ........................................ A01K 97/12
[58] Field of Search .......................... 43/17, 21.2, 16

[56] References Cited
UNITED STATES PATENTS

| | | | |
|---|---|---|---|
| 2,961,209 | 11/1960 | Willey | 43/21.2 |
| 3,058,251 | 10/1962 | Brooks | 43/17 |
| 3,285,360 | 11/1966 | Wetsch | 43/17 |
| 3,835,568 | 9/1974 | Whitfield | 43/17 |
| 3,862,508 | 1/1975 | Morgan | 43/21.2 |

Primary Examiner—Warner H. Camp
Attorney, Agent, or Firm—Harvey A. Gilbert

[57] ABSTRACT

A frame is insertable into the ground or mountable on any supporting structure such as the side of a boat or wharf and has an adjustable cradle fastened thereon for holding a fishing pole and includes spring and adjustable fastener means for applying the proper tension for the cradle contact with a push button switch which activates a horn and a light.

A rocker and tongue element are attached to the cradle in such a way that they permit cradle movement and positive switch contact while the cradle is mounted in combination with mounting elements permitting the in-ground and both horizontal and vertical surface mounting of the fishing pole holder.

10 Claims, 15 Drawing Figures

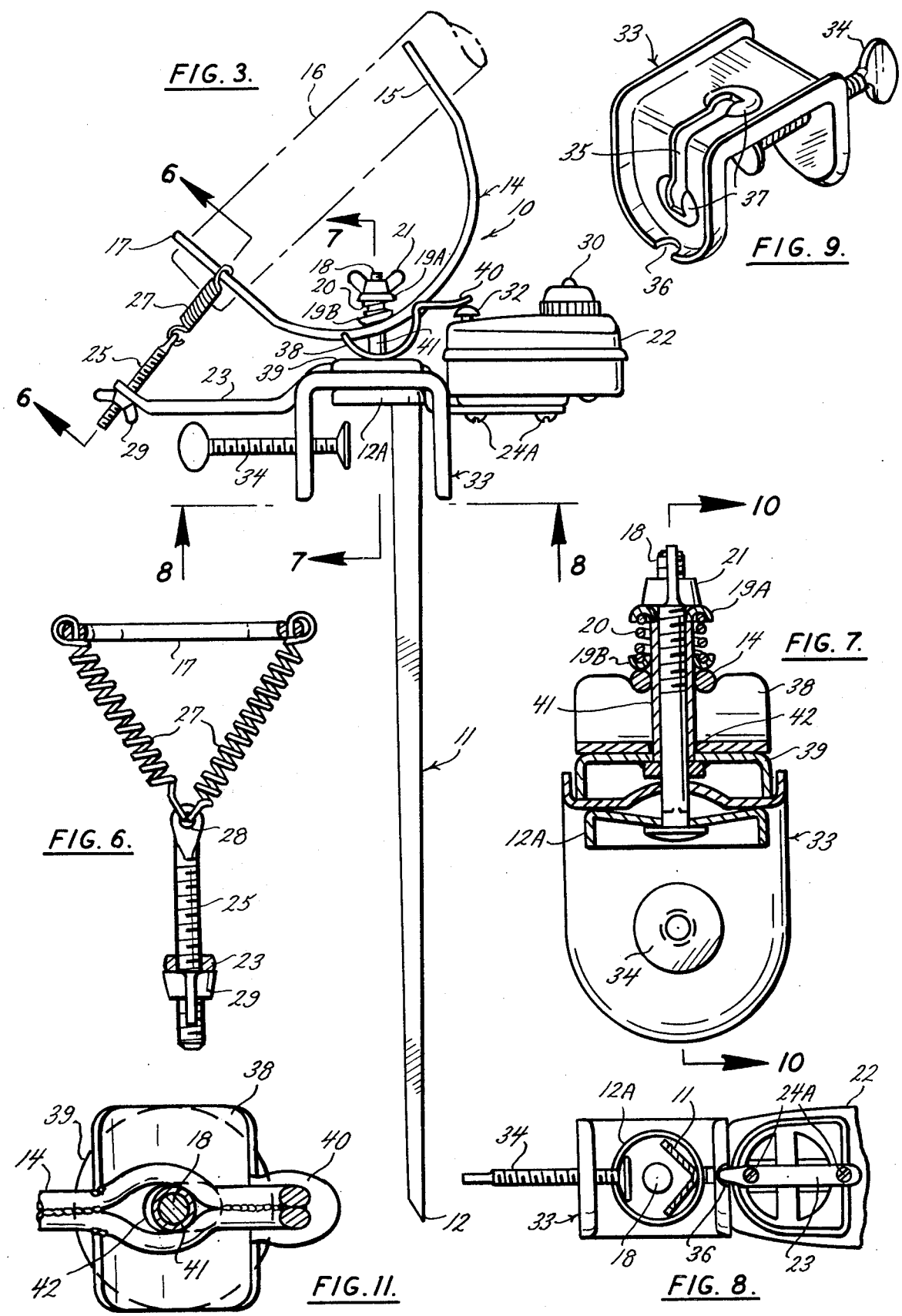

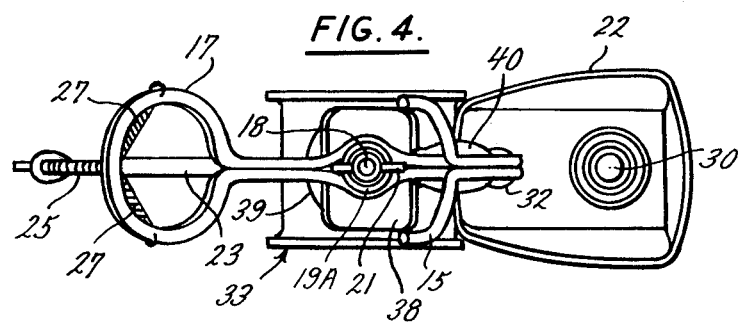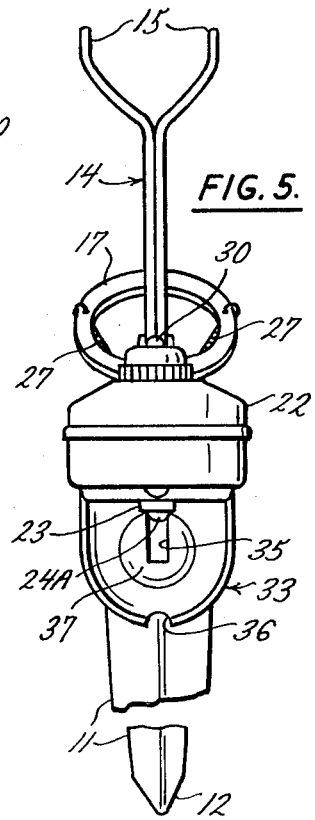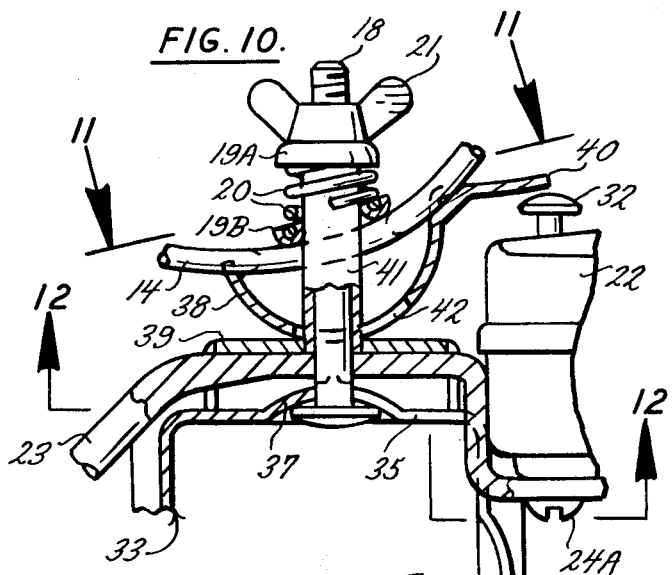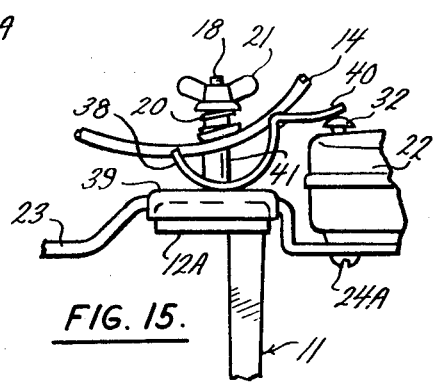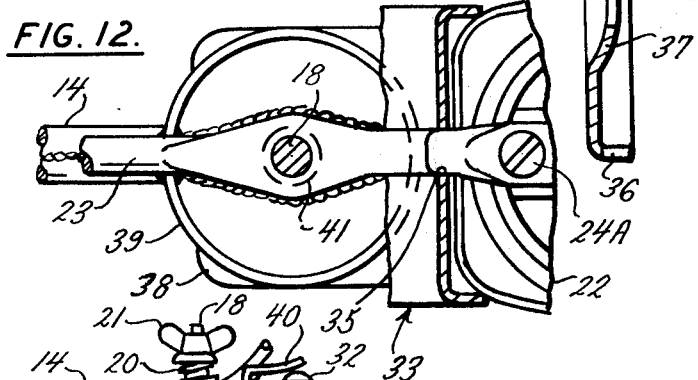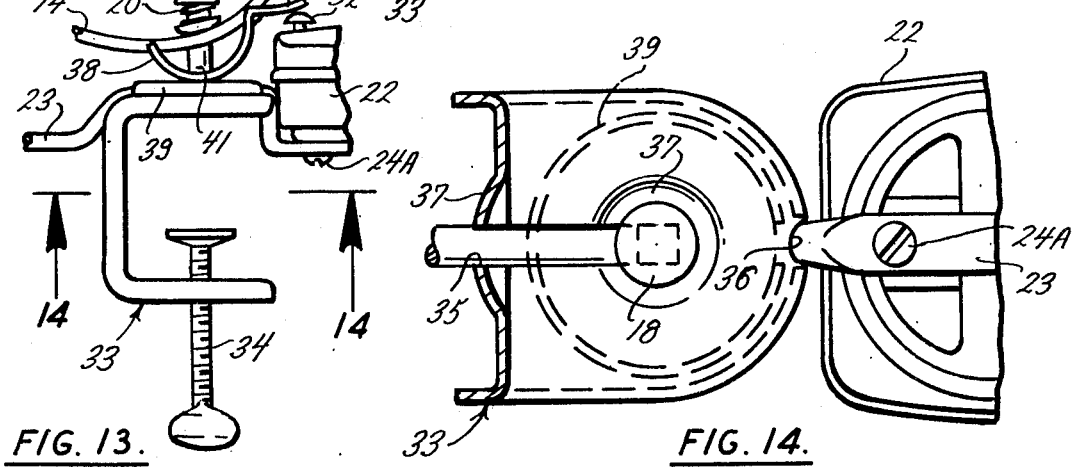

3,992,798

FISHING POLE HOLDER

CROSS REFERENCE TO RELATED APPLICATION

This application is a continuation in part of Ser. No. 549,906 filed February 14, 1975 and now U.S. Pat. No. 3,945,143.

BACKGROUND OF THE INVENTION

This invention relates to fishing tackle, and more particularly to a fishing pole holder for use at night and in the day time.

The present invention is capable of being mounted by several means. It is capable of performing without interference regardless of which mounting means is employed.

SUMMARY OF THE INVENTION

It is therefore the principal object of this invention to provide a fishing pole holder which will alert a fisherman when a fish strikes the fish hook on the line of the fishing pole.

Another object of this invention is to provide a fishing pole holder which when a fish strikes, the cradle of the device, will rock forward and urge down the push-button switch which will activate a horn and light simultaneously.

Another object of this invention is to provide a pole holder of the type described, which will have adjustment means for varying the tension between the cradle which holds the pole and frame.

Another object of the invention is to provide a holder of the type described which will be capable of being mounted to an object such as the side of a boat or the edge of a wharf either in a vertical or horizontal plane or may be mounted into the ground and which will be capable of performing its primary function of rocking to give indication of a fish catch regardless of the means by which it is mounted.

Yet another object of this invention is to provide a fishing pole holder with a multi-mount capability which may be conveniently and quickly arranged into any of its mounting configurations without the use of special tools.

Other objects of the invention are to provide a fishing pole holder which is simple in design, inexpensive to manufacture, rugged in construction, easy to use and efficient in operation.

BRIEF DESCRIPTION OF THE DRAWINGS

These and other objects will readily be evident upon study of the following specification and the accompanying drawings, wherein:

FIG. 3 is a perspective side view of the fishing rod holder showing the multi-mount configuration with the handle of the fishing rod shown in phantom lines.

FIG. 4 is a perspective top view of the fishing rod holder in the multi-mount configuration.

FIG. 5 is a perspective front view of the fishing rod holder in the multi-mount configuration showing the special keyed C-clamp 33 in non-interfering assembly with frame 11 for ground mounting.

FIG. 6 is a top section view taken along line 6—6 of FIG. 3 showing the mounting relation of the eye portion of cradle 17 and rod 23.

FIG. 7 is a section view taken along line 7—7 of FIG. 3 through the rocker platform neck 41 looking back towards C-clamp adjustment bolt 34.

FIG. 8 is a partial bottom view taken along line 8—8 of FIG. 3 and showing the fishing rod holder in the multi-mount configuration with a section through frame 11.

FIG. 9 is a perspective view of keyed C-clamp 33.

FIG. 10 is a partial side sectional view taken along line 10—10 of FIG. 7 showing rocker 38 in relation to rocker platform 39 and rocker platform neck 41, and the inter-locking relation between rod 23 and keyed C-clamp 33.

FIG. 11 is a top view of rocker 38 taken along line 11—11 of FIG. 10 with a partial section taken through cradle 14 and rocker platform neck 41.

FIG. 12 is a bottom view of rocker platform 39 showing relation to rod 23 with a partial section through keyed C-clamp 33 to further reveal the interlocking relation between rod 23 and keyed C-clamp 33.

FIG. 13 is a perspective partial side view showing the fishing rod holder configuration for mounting to objects in the horizontal plane.

FIG. 14 is a partial bottom sectional view taken along line 14—14 of FIG. 13 showing rod 23 in relation to keyed C-clamp 33 and horn 22.

FIG. 15 is a partial side perspective view of the fishing rod holder configured for ground mounting without keyed C-clamp 33.

DESCRIPTION OF THE PREFERRED EMBODIMENTS

Figure 1:
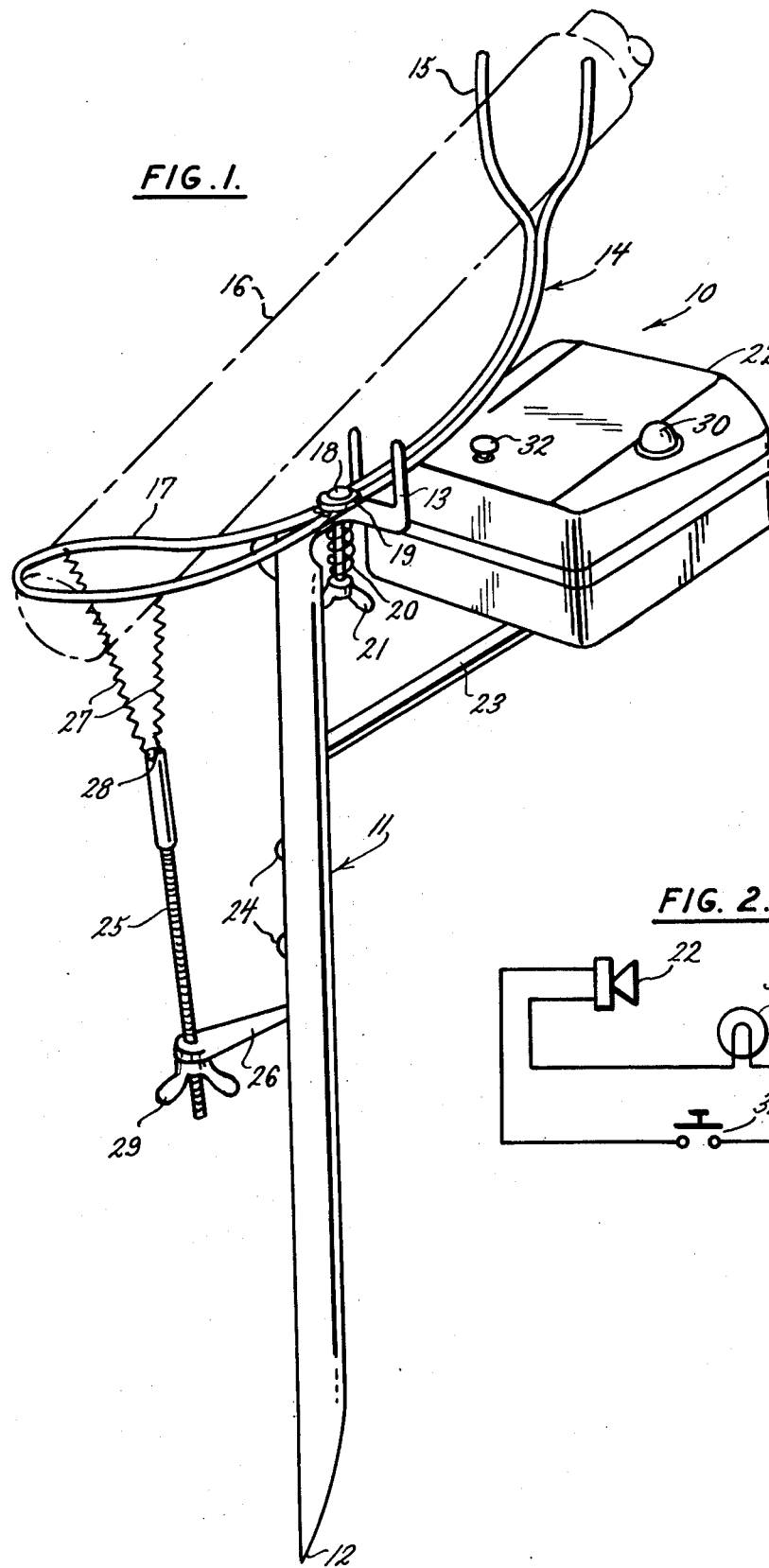
FIG. 1 is a perspective view of the present invention showing the butt of a fishing rod in phantom lines.
Figure 2:
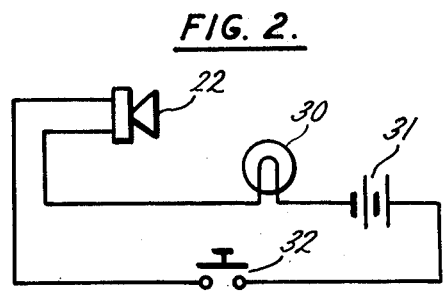
FIG. 2 is a schematic wiring diagram of the invention.

According to this invention, the fishing pole holder 10 is shown to include a frame 11 having a pointed end 12 and a U-shaped end 13 on the arcurate portion 13A. An arcurate shaped cradle 14 of holder 10 is provided with an open yoke 15 which receives the forward end of the pole 16 and the rear end of pole 16 is received within the eye means 17 of cradle 14.

A bolt fastener 18 receives a washer 19 and communicates through the arcurate portion of cradle 14 and arcurate portion 13 of frame 11. Coiled spring 20 and wing nut fastener 21 are received upon bolt fastener 18 to provide adjustment tension means between cradle 14 and arcurate portion 13A of frame 11. A horn 22 is secured fixedly in a suitable manner, to rod 23 which is secured fixedly to frame 11 by means of fasteners 24. A threaded bolt fastener 25 is threadably received within portion 26 of rod 23 and a pair of springs 27 are received at one end, within the eye portion 28 of bolt 25, the opposite ends of the springs 27 being secured on each of the sides of eye 17 of cradle 14. The springs 27 providing means of adjusting the pole holder 10 due to the various weights and sizes of fishing poles.

It shall be noted that the adjustment is such, that the cradle 14 must be a quarter of an inch above the push button switch 32 of horn 22.

Horn 22 is wired in series with battery 31, push button switch 32 and light 30.

In use, when a fish strikes the hook on the line of the pole 16, the cradle 14 is rocked forwardly because the end of the pole 16 is abutting the eye means 17 and thus, the forward portion of cradle 14 strikes the push button 32 and closes the circuit to the horn 22 and the light 30.

Referring to FIG. 3, fishing pole holder 10 is shown in its multi-mount configuration with keyed C-clamp 33 juxtaposed between rocker platform 39 of rod 23 and frame cap 12A of frame 11. In the configuration of FIG. 3 or the configuration of FIG. 15, wherein keyed C-clamp 33 has been removed, fishing pole holder 10 can be ground mounted. FIG. 10 shows keyed C-clamp 33 positioned for mounting fishing pole holder 10 to an object in the vertical plane, such as the side of a boat. FIG. 13 shows keyed C-clamp 33 in a position for mounting fishing pole holder 10 to an object in the horizontal plane, such as the edge of a wharf. FIG. 4 is a top view and FIG. 5 a front view of fishing pole holder 10 configured as shown in FIG. 3 with slotted C-clamp 33 and frame 11 in juxtaposition.

Multi mount operation is accomplished by arcurately shaped cradle 14 being permitted to perform its rocking function independent of the mounting mode employed. Thus, as shown in FIGS. 10 and 11, arcurately shaped cradle 14 attached to rocker means 38 and rocker tongue 40 by welding or similar means, is rockably secured to rocker platform 39 of rod 23. Arcurately shaped cradle 14 and rocker platform 39 are rockably secured together by inserting rocker platform neck 41 through slot 42 in rocker means 38 and an adjacent opening in arcurately shaped cradle 14, passing bolt 18 through slot 35 of slotted C-clamp 33 or frame cap 12A, up through rocker platform neck 41, placing lower cup washer 19B followed by coiled spring 20 down over rocker platform neck 41, and completing containment of coiled spring 20 at the top of rocker platform neck 41 by means of upper cup washer 19A and wing nut fastener 21.

FIGS. 7 and 10 show that when wing nut fastener 21 is tightened down, coiled spring 20 is in the slight state of compression between immovable upper cup washer 19A secured to the top of the rocker platform neck 41 and lower cup washer 19B in movable contact with arcurately shaped cradle 14. The result of the aforementioned fastening scheme is to permit movable retention of arcurately shaped cradle 14 relative to rocker platform 39.

The bottom of rocker platform 39 is welded to the segment of rod 23 adjacent to the entry point of bolt 18 to rocker platform neck 41, as shown in FIG. 12.

As shown in FIG. 3, rod 23 provides the support for rocker platform 39, for establishing tension adjustment between arcurately shaped cradle 14 and the rear portion of rod 23, and for supporting horn 22 in relation to rocker tongue 40.

FIG. 6 shows the connection of pair of springs 27 from the sides of eye portion 17 of arcurately shaped cradle 14 to eye portion 28 of threaded bolt fastener 25, through rod 23, and adjustably secured by wing nut 29. This tension adjustment between arcurately shaped cradle 14 and rod 23 compensates for the loading affects of many types of fishing poles which can be accommodated by fishing pole holder 10. The various loadings require this adjustment to assure proper positioning, approximately one-quarter inch, of rocker tongue 40 relative to push button switch 32 when horn 22 is mounted generally as shown on rod 23 in FIG. 3. The tension adjustment arrangement shown in FIG. 6 also serves to restrain side to side movement of arcurately shaped cradle 14 relative to rod 23 and push button switch 32, as may be seen in FIG. 4. Again this helps to assure rocker tongue 40 contact with push button switch 32 when a fish strike on the line of accommodated fish pole 16 occurs.

Rod 23 further provides support to horn 22 by means of fasteners 24 A. Horn 22 contains light 30, battery 31 and push button switch 32.

Keyed C-clamp 33 is attached to rod 23 by means of bolt 18 as shown in FIG. 3 for mounting fishing pole holder 10 to an object in the vertical plane. In this mounting configuration C-clamp notch 36 will be down as shown in FIG. 9, rod 23 will rest securely keyed in C-clamp slot 35 as shown in FIG. 3, and FIG. 10, and from a bottom view in FIG. 8, to prevent movement of rod 23 relative to keyed C-clamp 33. C-clamp adjustment bolt 34 will operate in the horizontal plane to secure fishing pole holder to a vertical plane object, such as the side of a boat. Attachment of keyed C-clamp 33 to rod 23 by means of bolt 18 can also be accomplished to permit mounting fishing pole holder 10 to an object, such as the edge of a wharf, in the horizontal plane. This configuration is shown from the side in FIG. 13 and from the bottom in FIG. 14. FIGS. 13 and 14 reveal how rod 23 behind rocker platform 39 rests in C-clamp slot 35 and how rod 23 forward of rocker platform 39 rests in C-clamp notch 36, again to prevent movement of rod 23 relative to keyed C-clamp 33. In this configuration C-clamp adjustment bolt 34 operates in the vertical plane to secure fishing pole holder 10. FIG. 15 reveals how rocker platform 39 is seated over frame cap 12A to permit ground mounting of fishing pole holder 10 by means of frame 11. The close fit relationship between rocker platform 39 and frame cap 12A to prevent movement of rod 23 relative to frame cap 12A in the ground mount configuration is more clearly revealed in FIG. 7. The removal of keyed C-clamp 33, shown between rocker platform 39 and frame cap 12A in FIG. 7, permits this close fit relation to exist. Finally, from FIG. 7, it may be seen that with keyed C-clamp 33 located between rocker platform 39 and frame cap 12A, the surface or friction contact between the surfaces of the adjoining elements when secured together with bolt 18 and wing nut fastener 21 is such as to prevent movement of rod 23 relative to keyed C-clamp 33 and frame cap 12A. Thus, each of the above discussed mounting arrangements provides a substantial means of support for fishing pole holder 10 without in any manner interferring with the desired rocking motion of cradle 14 relative to rocker platform 39.

It should be noted that for the multi-mount configuration of fishing pole holder 10, approximately ¼ inch of the shaft of bolt 18 adjacent to its head is square in cross-section to key in frame cap 12A as shown in FIG. 7 and with either end of C-clamp slot 35, depending on mounting configuration, within bolt head depressions 37, to prevent bolt 18 from turning when configuring fishing pole holder 10 with frame 11, keyed C-clamp 33, or both.

The above disclosure of this invention should not be considered to be limiting since variations can be made by those skilled in the art without departing from the scope and spirit of the following claims.

What I claim is:

1. A fishing pole holder, comprising, in combination, a horizontal support means, a platform with a vertically extending hollow neck, said platform centrally located on and permanently affixed to said horizontal support means, an arcurate cradle for accommodating said pole, a rocker means permanently affixed to an arcurate segment on the underside of said cradle, said arcurate cradle and said rocker means being slotted for rockable mounting about the neck of said platform, a mounting means for securing said fishing pole holder to a horizontal or vertical supporting object, a spring-loaded retaining means passing through the neck of said platform, thereby securing said cradle and said rocker means movably to said neck at the top of said platform and securing said mounting means immovably to the bottom of said platform, permitting rocking motion of said arcurate cradle upon said platform independent of said mounting means, a pushbutton actuated horn and light mounted forward of the platform on said horizontal support means in close relation to said arcurate cradle, a tension adjustment means affixed between the aft end of said horizontal support means and the aft end of said cradle to permit adjustment of cradle position for particular fishing pole loading such that said arcurate cradle remains in sufficiently close proximity with said push-button actuated horn and light to assure actuation indicating a fish strike.

2. A fishing pole holder, comprising, in combination, a horizontal support means, a platform with a vertically extending hollow neck, said platform centrally located on and permanently affixed to said horizontal support means, an arcurate cradle for accommodating said pole, a rocker means permanentaly affixed to an arcurate segment on the underside of said cradle, said arcurate cradle and said rocker means being slotted for rockable mounting about the neck of said platform, a mounting means for securing said fishing pole holder to a horizontal or vertical supporting object, a spring-loaded retaining means passing through the neck of said platform, thereby securing said cradle and said rocker means movably to said neck at the top of said platform and securing said mounting means immovably to the bottom of said platform permitting rocking motion of said arcurate cradle upon said platform independent of said mounting means, a tongue attached to said cradle forward of said rocker means, a push-button actuated horn and light mounted forward of the platform on said horizontal support means in close relation to said tongue, a tension adjustment means affixed between the aft end of said horizontal support means and aft end of said cradle to permit adjustment of cradle position for particular fishing pole loading such that said tongue remains in sufficiently close proximity with said push-button actuated horn and light to assure actuation indicating a fish strike.

3. The fishing pole holder of claim 2 wherein said arcurate cradle includes an open yoke forward and an eye portion aft to receive the forward and butt end, respectively, of a fishing pole handle.

4. The fishing pole holder in claim 3 wherein said hollow neck of said platform is centrally located on the top of said platform and extends up through said rocker means and said cradle beyond the top of said cradle.

5. The fishing pole holder of claim 3 wherein said tongue is an integral part of said rocker means.

6. The fishing pole holder of claim 3 wherein said tension adjustment means comprises a pair of springs and a wing-nut adjustable bolt having an eye in the end opposite the wing-nut, one end of each spring being attached to said bolt eye, the other end of each spring being attached to opposite sides of the aft end of said cradle, the wing nut end of the bolt being attached to the aft end of said horizontal support means to control the cradle position relative to said horizontal support means.

7. The fishing pole holder of claim 3 wherein said mounting means comprises a keyed C-clamp having a slot permitting mating with the horizontal support means for mounting said fishing pole holder to vertical objects and a slot and notch combination permitting mating with the horizontal support means for mounting said fishing pole holder to horizontal objects.

8. The fishing pole holder of claim 3 wherein said mounting means comprises a frame having a frame cap keyed for mating with the horizontal support means and a pointed end for mounting said fishing pole holder in the ground.

9. The fishing pole holder of claim 3 wherein the spring-loaded retaining means comprises a square shoulder bolt for keyed entry through and retention of said mounting means immovable in relation to the base of the platform of said horizontal support means, a coil spring, a pair of cup washers containing said spring between the top of said neck and the contact point of the lower cup washer with said arcurate cradle, and wing nut for securing the upper cup washer to the top of said neck.

10. The fishing pole holder of claim 3 wherein said rocker means is permanently affixed to a centrally located arcurate segment on the underside of said cradle.

* * * * *